Aug. 31, 1948.                     E. A. JONES                      2,448,436
                                  TRAILER HITCH
                               Filed July 10, 1946
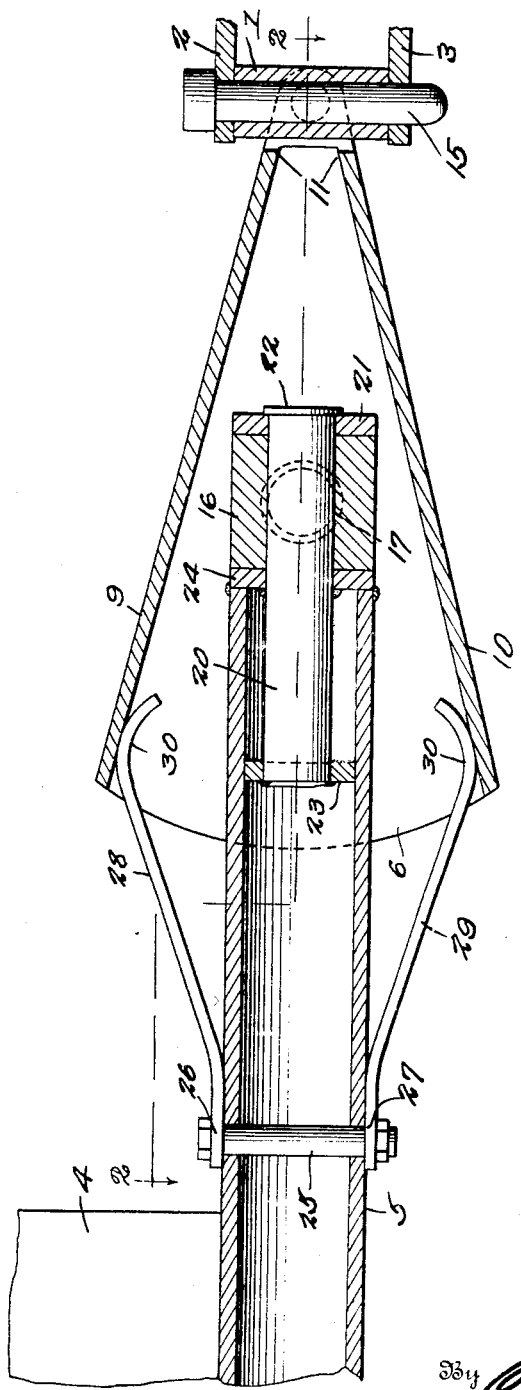
Inventor
E. A. Jones
By C. A. Snow & Co.
Attorneys.

Patented Aug. 31, 1948

2,448,436

UNITED STATES PATENT OFFICE 2,448,436

TRAILER HITCH

Earle A. Jones, Electra, Tex.

Application July 10, 1946, Serial No. 682,482

4 Claims. (Cl. 280—33.44)

This invention relates to a hitch suitable for use in interconnecting a power driven vehicle and trailer which is pulled by and behind the vehicle.

The object of the invention is to provide a hitch of novel and improved construction and which will effect a savings in the springs of both the vehicle and the trailer, a savings on tires, and reduce the wear and tear on the power or pulling vehicle and also on the trailer.

A still further object of the invention is the provision of a hitch so constructed and designed as to provide a free movement before the weight or lift caused by the trailer is applied to the power operated pulling vehicle.

Another object of the invention is the provision of a hitch having the aforesaid objects which is simple and therefore comparatively cheap of manufacture.

A still further object of the invention is the provision of a hitch which is efficient and durable in operation and which can be easily and quickly applied to or incorporated in combination with a trailer and the vehicle which pulls it.

Other objects, novel features of construction as well as improved results by the use of the invention will appear from the following description when read in the light of the accompanying drawings which illustrate one embodiment of the inventive concept.

In the drawings:

Fig. 1 is a vertical sectional view through the hitch and the tongue of the trailer.

Fig. 2 is a top plan view partially in horizontal section on the line 2—2 of Fig. 1.

Referring now to the drawings, I is a vertically disposed hollow bushing rotatably supported between a pair of horizontally disposed spaced bars 2 and 3 which are attached to and extend rearwardly from the rear end of the powered pulling vehicle. The trailer body is indicated at 4 and the trailer tongue at 5. This tongue is hollow and of cylindrical form and extends well forward of the trailer and into the open rear end 6 of a housing composed of a pair of spaced parallel side walls 7 and 8 interconnected at their top and lower edges by a top wall 9 and a bottom wall 10 respectively. The top and bottom walls are convergent towards the front end of the housing and stop short thereof as indicated at 11. The side walls of the housing extend forwardly beyond the top and bottom thereof and their forward ends 12 and 13 receive between them the hollow bushing 1. Stub shafts or pins 14 extend inwardly through both of the housing wall ends 12 and 13 and are rotatably supported on the bushing 1. A vertically disposed heading and removable coupling pin 15 extends downwardly through the hollow bushing and beyond the lower bar 3. This pin is disposed between the inner ends of the stub shafts 14.

The construction thus far described provides a mounting for the housing which permits the housing to swing pivotally in both horizontal and vertical planes.

A block 16 is disposed between the side walls of the housing intermediate the length thereof and is horizontally pivotally supported on oppositely disposed stub shafts 17 and 18 which shafts like the shafts 14, are held against displacement by any suitable means such as being welded as indicated at 19.

The forward end of the tongue is connected to the block 16 by a supplemental tongue element in the form of a cylindrical shaft or pin 20. In assembly a washer-like plate 21 is threaded on the pin 20 and moved into abutment with the head 22 of the pin. The block 16 is provided with a horizontal bore through which the pin rearwardly extends on into the hollow tongue 5. A spacer and supporting plate 23 is welded or otherwise suitably secured to the inner end of the pin. This plate engages the interior walls of the tongue and prevents the pin from rocking. An apertured plate 24 closes the outer end of the tongue and is suitably welded to the tongue and has engagement with the rear wall or face of the block 16.

A vertically disposed bolt 25 clamps the rear ends 26 and 27 of a pair of spring arms 28 and 29 to the upper and lower faces respectively of the tongue. The forward ends of these springs are curved at as 30 and bear against the inner faces of the upper and lower walls of the housing.

In operation, the necessary movement in a horizontal plane is taken care of through the rotation of the bushing 1 about the pin 15. The necessary vertical movement is accommodated through a pair of pivotal points, namely, the pivotal connection of the housing to the bushing by the stub shafts 14 and the pivotal connection of the trailer tongue to the housing on the stub shafts 17 and 18. Due to road inequalities provision must be made for oscillation about the longitudinal axis of the trailer tongue and this is provided for by the tongue pin 20 which is free to oscillate in the horizontal bore or passageway of the block 16. The pivotal connections and arrangement is such that there is a free movement before the weight or lift occasioned by movement of the trailer is applied to the powered vehicle.

The springs 28 and 29 are for the purpose of cushioning movement and is a desirable feature but the hitch will operate satisfactorily without the springs and accordingly they could be eliminated without defeating the purposes and advantages of the invention.

Departures in the actual construction embodying the inventive concept can be made without departing from the spirit of the invention and the invention accordingly is to be limited only within the scope of the hereinafter appended claims.

I claim:

1. An open ended housing having spaced and substantially vertically disposed side walls and top and bottom walls convergent toward the front end of the housing, the front end of said housing being both horizontally and vertically pivotally connected to the vehicle, the rear end of said housing being open, said trailer tongue extending into the housing through the open rear end thereof and being horizontally pivotally connected to the side walls of the housing, and the connection between the tongue and the housing permitting oscillation of the tongue about its longitudinal axis.

2. A hitch for interconnecting a powered vehicle and a trailer comprising, a housing having an open rear end and a front end which is both vertically and horizontally pivotally connected to the vehicle, a tongue connected to the trailer and extending into the housing through the open rear end thereof, a block horizontally pivotally connected to the housing and disposed interiorly thereof, a pair of leaf-like springs at the opposite sides of the tongue, said springs engaging the upper and lower walls of the housing, and a horizontally disposed pin extending beyond the front end of the tongue and rotatably supported in the block for oscillation about its longitudinal axis.

3. A hitch for interconnecting a powered vehicle and the tongue of a trailer comprising, an open ended housing having spaced and substantially vertically disposed parallel side walls and top and bottom walls convergent towards the front end of the housing, the rear end of the housing being open, a hollow vertically disposed bushing carried by the powered vehicle, the front end of the housing being horizontally pivotally connected to said bushing, a vertical pivot about which said bushing is rotatable, a block interior of the housing supported between the side walls thereof on horizontally disposed pivots, the tongue of said trailer having a portion extending through said block and rotatable therein about the longitudinal axis of the tongue, and means to prevent longitudinal movement of said tongue in respect to said block.

4. A hitch for interconnecting a powered vehicle and a trailer comprising, a housing having an open rear end and a front end which is both vertically and horizontally pivotally connected to the vehicle, a tongue connected to the trailer and extending into the housing through the open rear end thereof, a block horizontally pivotally connected to the housing and disposed interiorly thereof, yieldable members secured to opposite sides of the tongue and engaging the inner surface of the housing normally holding the tongue and housing in alignment, and a horizontally disposed pin extending beyond the front end of the tongue and rotatably supported in the block for oscillation about its longitudinal axis.

EARLE A. JONES.

REFERENCES CITED

The following references are of record in the file of this patent:

UNITED STATES PATENTS

| Number | Name | Date |
| --- | --- | --- |
| 1,229,465 | Hudson | Jan. 12, 1917 |
| 1,365,013 | Wright | Jan. 11, 1921 |
| 1,934,141 | Prentice | Nov. 7, 1932 |